(12) United States Patent
Abdo et al.

(10) Patent No.: US 9,235,452 B2
(45) Date of Patent: Jan. 12, 2016

(54) GRAPHICS REMOTING USING AUGMENTATION DATA

(75) Inventors: Nadim Y. Abdo, Bellevue, WA (US); Asael Dror, San Francisco, CA (US); Wilhelm R. Schmieder, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 747 days.

(21) Appl. No.: 12/701,017

(22) Filed: Feb. 5, 2010

(65) Prior Publication Data

US 2011/0197151 A1     Aug. 11, 2011

(51) Int. Cl.
*G06F 3/048* (2013.01)
*G06F 9/54* (2006.01)
*G06F 9/44* (2006.01)
*G06T 1/00* (2006.01)
*G06F 17/30* (2006.01)

(52) U.S. Cl.
CPC .............. *G06F 9/542* (2013.01); *G06F 9/4445* (2013.01); *G06T 1/00* (2013.01); *G06F 17/30017* (2013.01); *G06F 17/30244* (2013.01); *G06F 17/30716* (2013.01); *G06F 2209/544* (2013.01); *G06F 2209/545* (2013.01)

(58) Field of Classification Search
CPC .......... G06F 3/04845; G06F 17/30244; G06F 17/30716; G06F 17/30017
USPC ......... 715/764, 803, 765, 740, 744, 746, 761, 715/778
See application file for complete search history.

(56) References Cited

U.S. PATENT DOCUMENTS

| | | | | |
|---|---|---|---|---|
| 4,555,775 A | * | 11/1985 | Pike | G09G 5/14 715/790 |
| 4,952,051 A | * | 8/1990 | Lovell | G06T 13/80 345/473 |
| 5,058,064 A | * | 10/1991 | Hahm | G11C 8/00 365/189.08 |
| 5,157,782 A | * | 10/1992 | Tuttle | G06F 11/3688 714/25 |
| 5,249,263 A | * | 9/1993 | Yanker | G06F 3/04845 345/594 |
| 5,335,342 A | * | 8/1994 | Pope | G06F 11/3672 714/38.13 |
| 5,359,671 A | * | 10/1994 | Rao | G06K 9/6857 382/225 |
| 5,436,981 A | * | 7/1995 | Ishikawa | G06T 11/60 358/462 |
| 5,526,474 A | * | 6/1996 | Fukushima | G06T 11/203 345/443 |
| 5,625,833 A | * | 4/1997 | Levine | G06F 3/033 715/203 |
| 5,760,793 A | * | 6/1998 | Ellert | G09G 5/393 345/536 |
| 5,828,369 A | * | 10/1998 | Foster | G06T 13/00 345/474 |
| 5,884,014 A | * | 3/1999 | Huttenlocher | G06K 15/02 358/1.15 |

(Continued)

FOREIGN PATENT DOCUMENTS

WO     WO 2006061897 A1 *  6/2006   .............. G06T 3/403

OTHER PUBLICATIONS

Virtual Network Computing, http://www.fifi.org/doc/vnc-common/faq.html, 1999.*

(Continued)

*Primary Examiner* — Boris Pesin
*Assistant Examiner* — John Heffington
(74) *Attorney, Agent, or Firm* — Kate Drakos; Danielle Johnston Holmes; Micky Minhas

(57) ABSTRACT

Methods and systems are disclosed in which bitmap data transmission is improved by using some of the advantages of primitive remoting, thus allowing for the reduction of the bandwidth and processing needed to remote a virtual desktop experience. In an embodiment, rendering is performed and bitmaps are remoted, but metadata comprising shortcuts or hints are provided to assist in the rendering of the bitmap data.

20 Claims, 14 Drawing Sheets

(56) References Cited

U.S. PATENT DOCUMENTS

| | | | | |
|---|---|---|---|---|
| 5,917,501 | A * | 6/1999 | Muller | G06F 17/2314 345/467 |
| 5,977,966 | A * | 11/1999 | Bogdan | G06F 3/0481 715/765 |
| 5,982,387 | A * | 11/1999 | Hellmann | G06K 15/02 345/467 |
| 6,002,401 | A * | 12/1999 | Baker | G06F 17/30067 345/473 |
| 6,121,981 | A * | 9/2000 | Trower, II | G06T 13/80 345/473 |
| 6,141,022 | A | 10/2000 | Anfossi et al. | |
| 6,167,439 | A * | 12/2000 | Levine | G06F 3/0483 358/408 |
| 6,204,847 | B1 * | 3/2001 | Wright | G06F 9/4443 715/803 |
| 6,243,646 | B1 * | 6/2001 | Ozaki | G01C 21/3632 701/437 |
| 6,307,573 | B1 * | 10/2001 | Barros | G06F 17/30241 345/440 |
| 6,366,695 | B1 * | 4/2002 | Nicholson | G06K 9/00442 382/173 |
| 6,480,201 | B1 * | 11/2002 | Fushiki | G06T 9/005 345/592 |
| 6,486,888 | B1 * | 11/2002 | Fushiki | G06T 9/005 345/592 |
| 6,571,242 | B1 * | 5/2003 | Hao | G01C 15/00 1/1 |
| 6,573,915 | B1 * | 6/2003 | Sivan | G09G 5/14 715/781 |
| 6,675,387 | B1 * | 1/2004 | Boucher | H04N 19/503 370/487 |
| 6,683,978 | B1 * | 1/2004 | Iourcha | G06T 9/005 382/166 |
| 6,717,596 | B1 * | 4/2004 | Nason | G06F 3/038 715/778 |
| 6,731,295 | B1 | 5/2004 | MacInnis et al. | |
| 7,293,243 | B1 * | 11/2007 | Ben-Shachar | G06F 3/1454 715/751 |
| 7,376,901 | B2 * | 5/2008 | Shen | H04L 29/06 715/751 |
| 7,404,014 | B2 | 7/2008 | Mairs et al. | |
| 7,447,997 | B2 * | 11/2008 | Colle | G09G 5/36 715/764 |
| 7,460,725 | B2 | 12/2008 | Malladi et al. | |
| 7,707,513 | B2 * | 4/2010 | Broda | H04L 67/02 715/783 |
| 7,757,001 | B2 * | 7/2010 | van Ieperen | G06F 9/4445 345/2.2 |
| 7,870,504 | B1 * | 1/2011 | McIntosh | G06F 9/4445 715/704 |
| 8,079,039 | B2 * | 12/2011 | Lavoie | G06F 9/4443 715/762 |
| 8,082,517 | B2 * | 12/2011 | Ben-Shachar | G06F 3/1454 715/751 |
| 8,095,885 | B1 * | 1/2012 | Schendel | G06F 3/0481 345/557 |
| 8,136,051 | B2 * | 3/2012 | Friedlander | G06F 3/0481 715/803 |
| 8,238,662 | B2 * | 8/2012 | Banerjee | G06F 3/04845 382/174 |
| 8,269,876 | B2 * | 9/2012 | Naruto | G06F 3/04845 348/333.02 |
| 8,434,009 | B2 * | 4/2013 | Fuse | H04N 7/15 709/204 |
| 8,527,882 | B2 * | 9/2013 | Swartz | G06F 3/0481 707/706 |
| 8,532,346 | B2 * | 9/2013 | Thorn | G06F 3/04845 345/620 |
| 8,726,156 | B2 * | 5/2014 | Kitabayashi | G06F 3/048 715/716 |
| 8,817,054 | B1 * | 8/2014 | Fisher | G09G 5/346 345/684 |
| 8,929,686 | B2 * | 1/2015 | Evevsky | G06K 9/036 382/305 |
| 2001/0032221 | A1 * | 10/2001 | Anwar | G06F 3/1203 715/209 |
| 2002/0000998 | A1 * | 1/2002 | Scott | G06F 17/30274 345/667 |
| 2002/0015055 | A1 | 2/2002 | Foran | |
| 2002/0039198 | A1 * | 4/2002 | Nguyen | G06K 15/02 358/1.18 |
| 2003/0189599 | A1 * | 10/2003 | Ben-Shachar | G06F 3/1454 715/790 |
| 2003/0210803 | A1 * | 11/2003 | Kaneda | G06T 1/0028 382/100 |
| 2004/0222995 | A1 * | 11/2004 | Colle | C09G 5/36 345/545 |
| 2004/0235447 | A1 * | 11/2004 | Gronberg | H04L 1/1614 455/403 |
| 2004/0263690 | A1 * | 12/2004 | Holland | H04N 5/44504 348/569 |
| 2005/0091571 | A1 | 4/2005 | Leichtling | |
| 2005/0165992 | A1 | 7/2005 | Sauber | |
| 2005/0232284 | A1 * | 10/2005 | Karaoguz | H04L 12/66 370/401 |
| 2005/0271275 | A1 * | 12/2005 | Chang | G06K 9/00456 382/176 |
| 2006/0117036 | A1 * | 6/2006 | Cruanes | G06F 17/30498 1/1 |
| 2006/0161814 | A1 * | 7/2006 | Wocke | G06K 9/6251 714/26 |
| 2006/0200775 | A1 * | 9/2006 | Behr | G06F 3/0481 715/767 |
| 2006/0206911 | A1 * | 9/2006 | Kim | G08B 13/19686 725/12 |
| 2006/0218611 | A1 * | 9/2006 | Son | H04L 12/2801 725/105 |
| 2006/0294125 | A1 * | 12/2006 | Deaven | H04N 19/46 1/1 |
| 2007/0046980 | A1 | 3/2007 | Coleman et al. | |
| 2007/0156689 | A1 * | 7/2007 | Meek | G06F 9/541 1/1 |
| 2007/0174881 | A1 * | 7/2007 | Idehara | H04L 29/06027 725/90 |
| 2007/0220168 | A1 | 9/2007 | Parsons et al. | |
| 2007/0234212 | A1 * | 10/2007 | de Souza | G06F 3/0481 715/703 |
| 2008/0115074 | A1 * | 5/2008 | Lindsay | G06F 9/4443 715/768 |
| 2008/0163106 | A1 * | 7/2008 | Jung | G11B 19/025 715/803 |
| 2008/0201405 | A1 | 8/2008 | Duursma et al. | |
| 2008/0288519 | A1 | 11/2008 | Stoyanov et al. | |
| 2008/0301566 | A1 | 12/2008 | Abdo et al. | |
| 2008/0301579 | A1 * | 12/2008 | Jonasson | G06F 17/30058 715/803 |
| 2009/0022394 | A1 * | 1/2009 | Banerjee | G06F 3/04845 382/164 |
| 2009/0064034 | A1 * | 3/2009 | Li | G06F 3/14 715/803 |
| 2009/0102838 | A1 | 4/2009 | Bullard et al. | |
| 2009/0183110 | A1 * | 7/2009 | Murtagh | G06F 9/4443 715/803 |
| 2009/0290458 | A1 * | 11/2009 | Lin | G11B 27/034 369/47.1 |
| 2010/0073544 | A1 * | 3/2010 | Naruto | G06F 3/04845 348/333.02 |
| 2010/0180228 | A1 * | 7/2010 | Ben-Harrush | G06F 1/3218 715/803 |
| 2010/0232704 | A1 * | 9/2010 | Thorn | G06F 3/04845 382/195 |
| 2010/0235781 | A1 * | 9/2010 | Friedlander | G06F 3/0481 715/803 |
| 2010/0293501 | A1 * | 11/2010 | Russ | G06F 3/04886 715/803 |
| 2011/0010661 | A1 * | 1/2011 | Wade | G06F 17/30905 715/803 |
| 2011/0096095 | A1 * | 4/2011 | Xu | G06F 3/012 345/657 |

OTHER PUBLICATIONS

RFB Protocol, Richardsons, RealVNC Ltd, Aug. 12, 2003.*
Ask Search, vnc uses rfb.*

(56) References Cited

OTHER PUBLICATIONS

Ask Search, vnc rfb.*
Ask Search, vnc primitive.*
Ask.Com, RFB protocol, 2011.*
Running Windows Programs Using VNC (aka RFB), Stirling, http://www.fifi.org/doc/vnc-common/faq.html, Mar. 26, 2005.*
RFB Protocol version 3.3, Richardsons et al., ORL Cambridge, Jan. 1998.*
Ask-RFB_protocol—Jan. 16, 2012.*
Ask-Search-q=vnc+primitive&qsrc=0&o=0&l=dir.pdf—Jan. 16, 2012.*
Ask-Search-q=vnc+rfb&qsrc=0&o=0&l=dir.pdf—Jan. 16, 2012.*
Ask-Search-q=vnc+uses+rfb&qsrc=0&frstpgo=0&o=0&l=di.pdf—Jan. 16, 2012.*
Bing search 1 Feb. 9, 2015.*
Bing search 2 Feb. 9, 2015.*
Bing search q=full%20screen%20capture%20bitmap%2 Sep. 6, 2015.*
Bing search q=full+screen+capture+bitmap+virtual Sep. 6, 2015.*
Ning search q=screen%20capture%20bitmap%20virtua Sep. 6, 2015.*
Remote-frame-buffer-protocol-1998-1-16-2012*
Remote-frame-buffer-protocol-2003—Jan. 16, 2012.*
Running-windows-programs-using-vnc-rfb-3-26-2005=1-16-2012.*
The International Search Report and Written Opinion of the International Searching Authority dated Oct. 27, 2011, issued in International application No. PCT/US2011/023800, filed Feb. 4, 2011.
Microsoft Corporation, "Windows 7 Developer Guide: Richer Application Experiences," retrieved Nov. 20, 2009, 9 pages, downloaded at http://msdn.microsoft.com/en-us/windows/dd239181.aspx.
Stock, M., "Technologies for Thin Client Architectures: Master Thesis in Computer Science," Jan. 2001, 126 pages, downloaded at http://www.ifi.uzh.ch/ifiadmin/staff/rofrei/DA/DA_Arbeiten_2002/Stock_Mike.pdf.
Sneath, T., "A Guided Tour of Windows Presentation Foundation," retrieved Nov. 20, 2009, 33 pages, downloaded at http://msdn.microsoft.com/en-us/library/aa480221.aspx.

* cited by examiner

GRAPHICS REMOTING USING AUGMENTATION DATA

BACKGROUND

Remote computing systems can enable users to remotely access hosted resources. Servers on the remote computing systems can execute programs and transmit signals indicative of a user interface to clients that can connect by sending signals over a network conforming to a communication protocol such as the TCP/IP protocol. Each connecting client may be provided a remote presentation session, i.e., an execution environment that includes a set of resources. Each client can transmit signals indicative of user input to the server and the server can apply the user input to the appropriate session. The clients may use remote presentation protocols such as the Remote Desktop Protocol (RDP) to connect to a server resource.

In remote desktop scenarios the graphics content of a user's desktop located on a host computer (e.g., the server) is typically streamed to another computer (e.g., the client). Typically client screens are captured as frames which are then passed to a remote presentation process for encoding and transmitting the bitmap data to produce a remote presentation network stream comprising bitmap data.

SUMMARY

In some remote presentation systems a stream of graphics rendering commands and image data may be transmitted to render images. It would be advantageous to combine the features of techniques involving the transmission of primitives and the transmission of full bitmaps to provide a method and system that incorporates the benefits of both techniques.

In various embodiments, methods and systems are disclosed in which bitmap data transmission may be improved by using some of the advantages of primitive remoting, thus allowing for the reduction of the bandwidth and processing needed to remote a virtual desktop experience. In an embodiment, rendering is performed and bitmaps are remoted, but metadata comprising shortcuts or hints are provided to assist in the rendering of the bitmap data.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for altering a view perspective within a virtual environment in accordance with this specification are further described with reference to the accompanying drawings in which.

DETAILED DESCRIPTION

Computing Environments in General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

Figure 1:
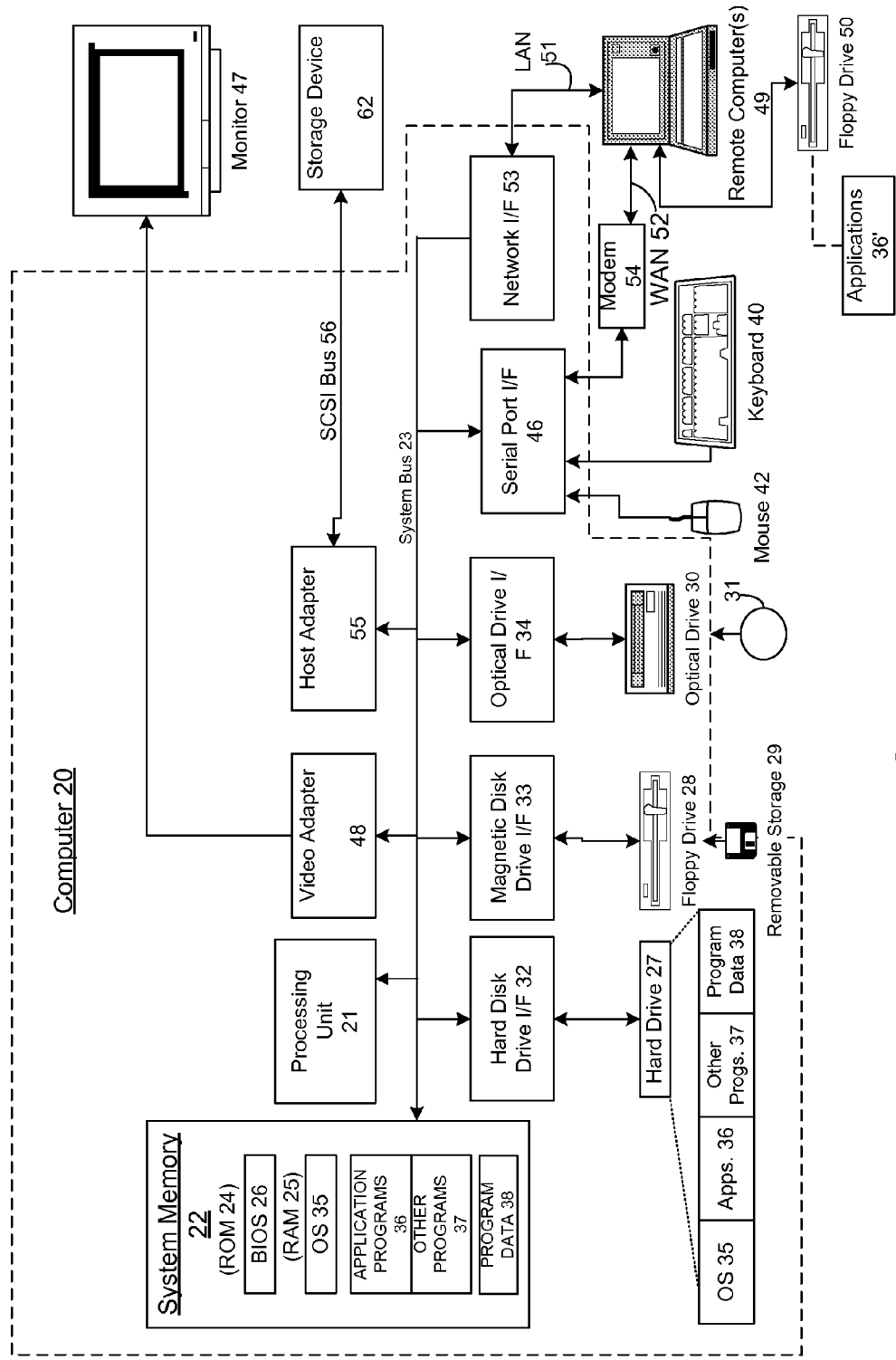
FIGS. 1 and 2 depict an example computer system wherein aspects of the present disclosure can be implemented.
Figure 2:
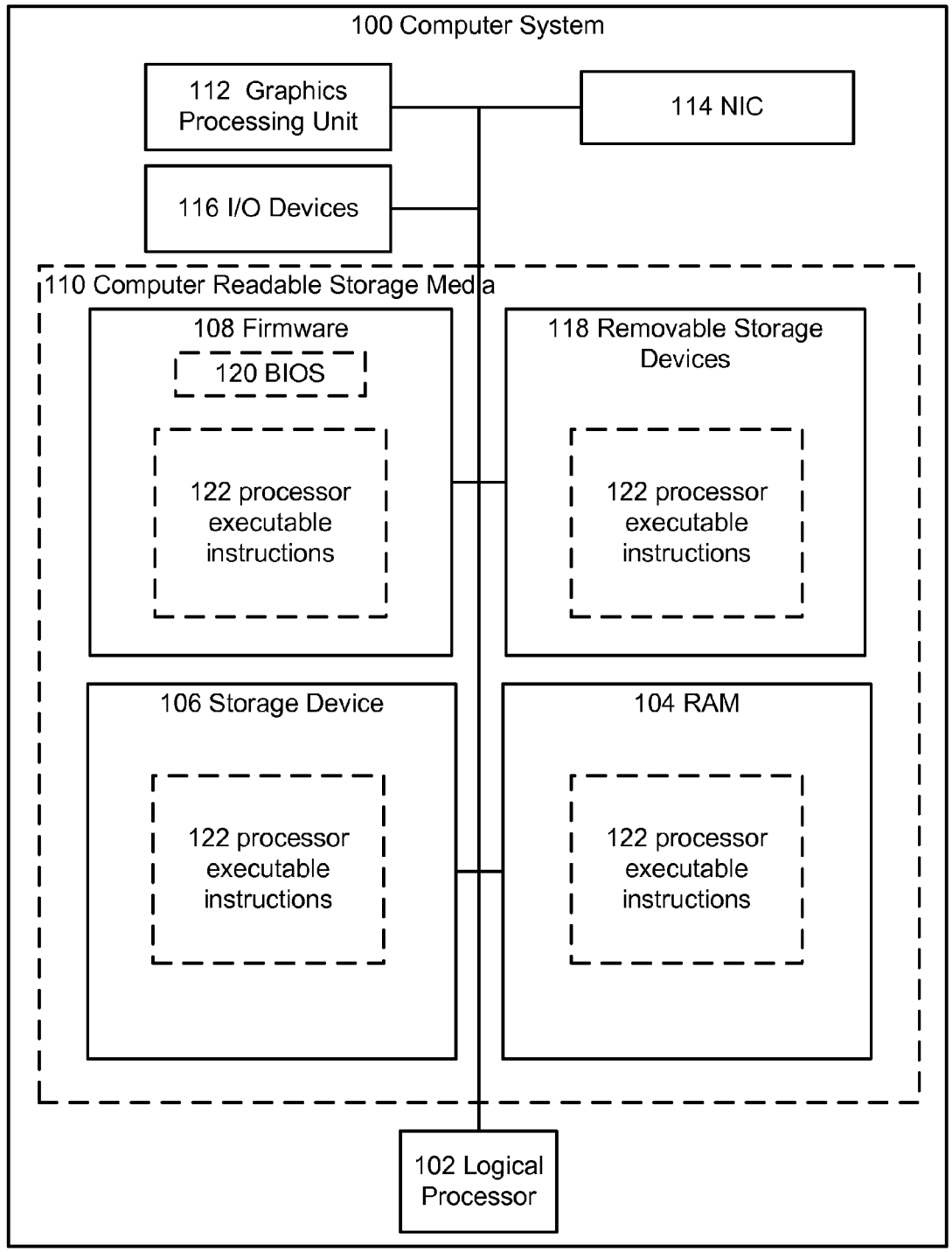

Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media provide non-volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
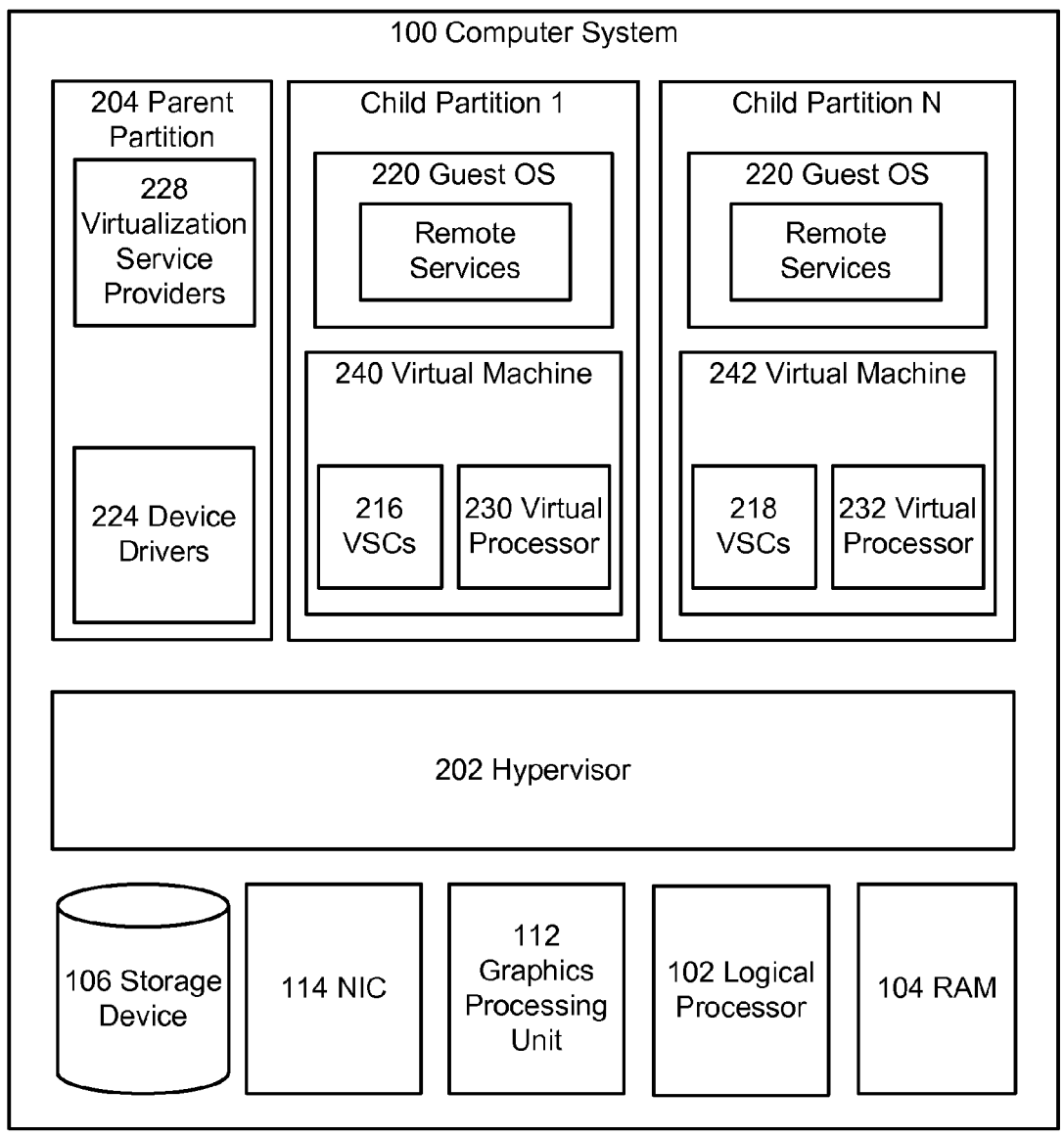
FIG. 3 depicts an operational environment for practicing aspects of the present disclosure.
Figure 4:
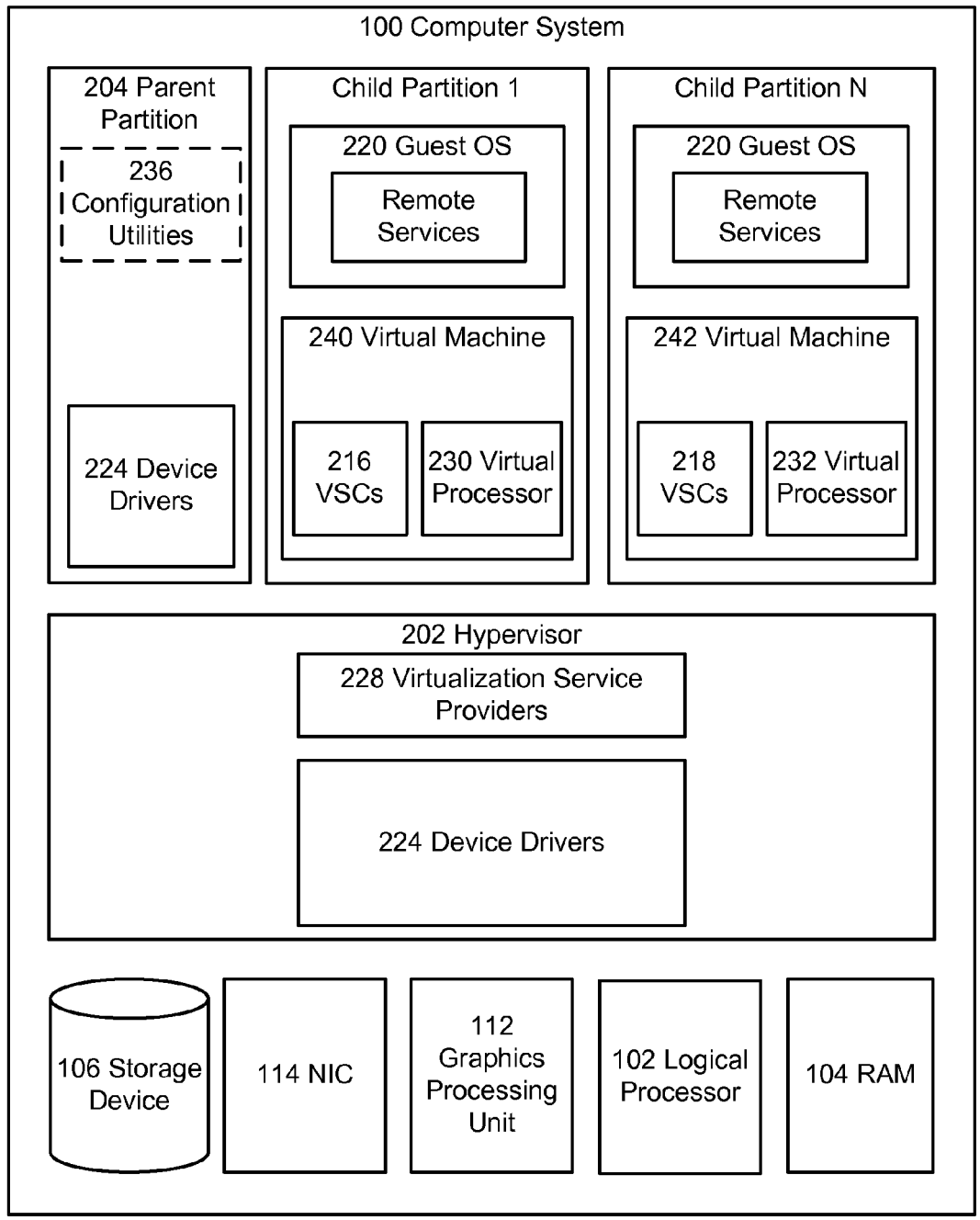
FIG. 4 depicts an operational environment for practicing aspects of the present disclosure.

Referring now to FIGS. 3 and 4, depicted are high level block diagrams of computer systems configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 4, illustrated is an alternative architecture that can be used to effectuate virtual machines. FIG. 4 depicts similar components to those of FIG. 3, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 4 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 5:
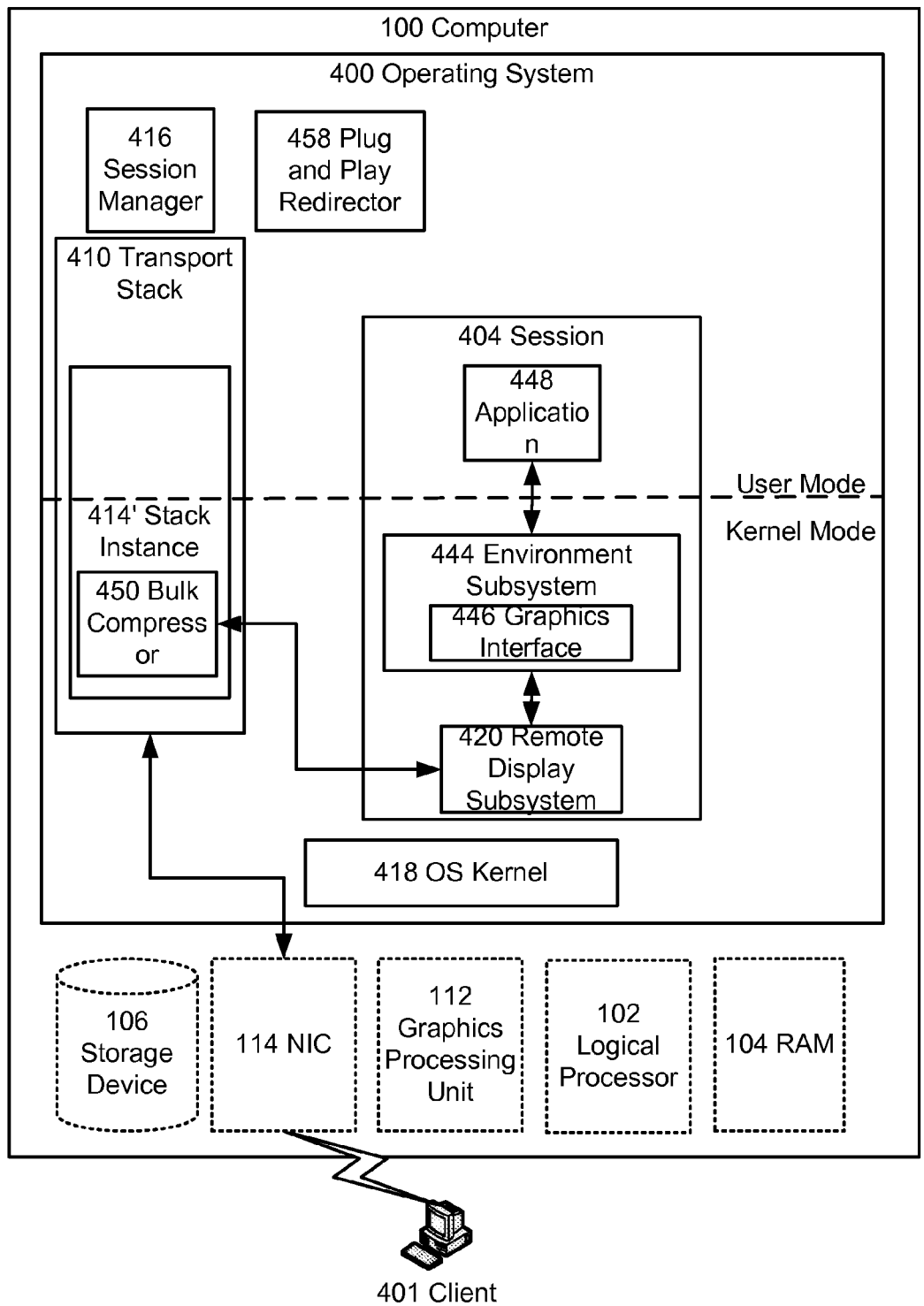
FIG. 5 illustrates a computer system including circuitry for effectuating remote desktop services.

Referring now to FIG. 5, computer 100 may include circuitry configured to provide remote desktop services to connecting clients. In an example embodiment, the depicted operating system 400 may execute directly on the hardware or a guest operating system 220 or 222 may be effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1b. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a terminal server via a terminal server gateway, the gateway may open a socket connection with the terminal server and redirect client traffic on the remote presentation port or a port dedicated to remote access services. The gateway may also perform certain gateway specific exchanges with the client using a terminal server gateway protocol transmitted over HTTPS.

Figure 6:
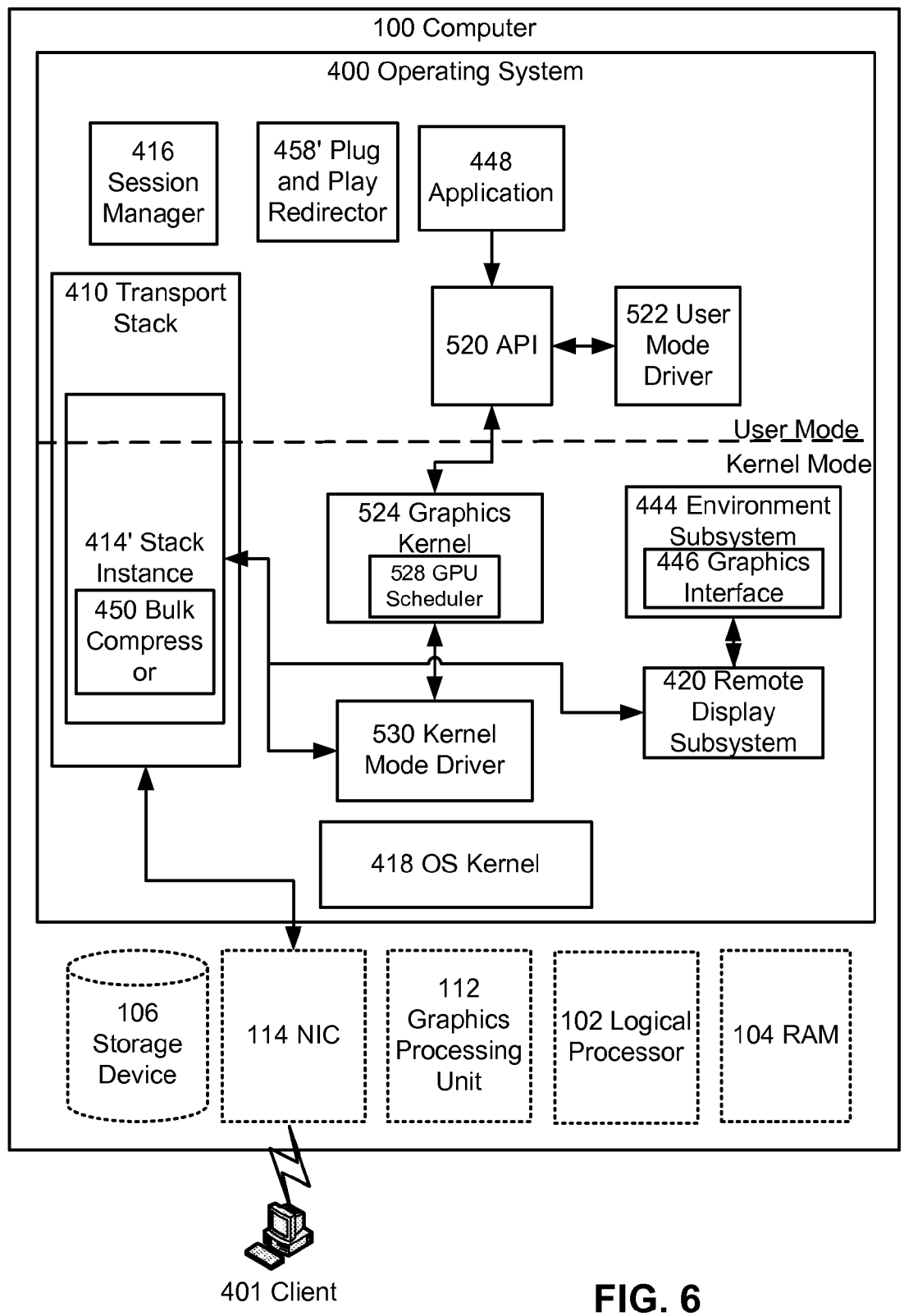
FIG. 6 illustrates a computer system including circuitry for effectuating remote services.

Turning to FIG. 6, depicted is a computer system 100 including circuitry for effectuating remote services and for incorporating aspects of the present disclosure. As shown by the figure, in an embodiment a computer system 100 can include components similar to those described in FIG. 2 and FIG. 5, and can effectuate a remote presentation session. In an embodiment of the present disclosure a remote presentation session can include aspects of a console session, e.g., a session spawned for a user using the computer system, and a remote session. Similar to that described above, the session manager 416 can initialize and manage the remote presentation session by enabling/disabling components in order to effectuate a remote presentation session.

One set of components that can be loaded in a remote presentation session are the console components that enable high fidelity remoting, namely, the components that take advantage of 3D graphics and 2D graphics rendered by 3D hardware.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

Illustrated now is an example of the operation of a virtualized GPU as used in conjunction with an application that calls for remote presentation services. Referring to FIG. 6, in an embodiment a virtual machine session can be generated by a computer 100. For example, a session manager 416 can be executed by a logical processor 102 and a remote session that includes certain remote components can be initialized. In this example the spawned session can include a kernel 418, a graphics kernel 524, a user mode display driver 522, and a kernel mode display driver 530. The user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers. The GPU scheduler 528 can run and determine to render the contents of the buffer. In this example the command to the graphics processing unit 112 of the server can be captured and the content of the buffer (primitives) can be sent to client 401 via network interface card 114. In an embodiment, an API can be exposed by the session manager 416 that components can interface with in order to determine whether a virtual GPU is available.

In an embodiment a virtual machine such as virtual machine 240 of FIG. 3 or 4 can be instantiated and the virtual machine can serve as a platform for execution for the operating system 400. Guest operating system 220 can embody operating system 400 in this example. A virtual machine may be instantiated when a connection request is received over the network. For example, the parent partition 204 may include an instance of the transport stack 410 and may be configured to receive connection requests. The parent partition 204 may initialize a virtual machine in response to a connection request along with a guest operating system including the capabilities to effectuate remote sessions. The connection request can then be passed to the transport stack 410 of the guest operating system 220. In this example each remote session may be instantiated on an operating system that is executed by its own virtual machine.

In one embodiment a virtual machine can be instantiated and a guest operating system 220 embodying operating system 400 can be executed. Similar to that described above, a virtual machine may be instantiated when a connection request is received over the network. Remote sessions may be generated by an operating system. The session manager 416 can be configured to determine that the request is for a session that supports 3D graphics rendering and the session manager 416 can load a console session. In addition to loading the console session the session manager 416 can load a stack instance 414' for the session and configure system to capture primitives generated by a user mode display driver 522.

The user mode driver 522 may generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

The GPU scheduler 528 may execute and determine to issue an instruction to render the content of the buffer. In this example the graphics primitives associated with the instruction to render can be sent to client 401 via network interface card 114.

In an embodiment, at least one kernel mode process can be executed by at least one logical processor 112 and the at least one logical processor 112 can synchronize rendering vertices stored in different buffers. For example, a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

One or more threads of a process such as a videogame may map multiple buffers and each thread may issue a draw command. Identification information for the vertices, e.g., information generated per buffer, per vertex, or per batch of vertices in a buffer, can be sent to the GPU scheduler 528. The information may be stored in a table along with identification information associated with vertices from the same, or other processes and used to synchronize rendering of the various buffers.

An application such as a word processing program may execute and declare, for example, two buffers—one for storing vertices for generating 3D menus and the other one storing commands for generating letters that will populate the menus. The application may map the buffer and; issue draw commands. The GPU scheduler 528 may determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

A bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

In an embodiment, the graphics processing unit 112 may be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

An operating system 400 may be configured, e.g., various subsystems and drivers can be loaded to capture primitives and send them to a remote computer such as client 401. Similar to that described above, a session manager 416 can be executed by a logical processor 102 and a session that includes certain remote components can be initialized. In this example the spawned session can include a kernel 418, a graphics kernel 524, a user mode display driver 522, and a kernel mode display driver 530.

A graphics kernel may schedule GPU operations. The GPU scheduler 528 can merge separate buffers of vertices into the correct execution order such that the graphics processing unit of the client 401 executes the commands in an order that allows them to be rendered correctly.

All of these variations for implementing the above mentioned partitions are just exemplary implementations, and nothing herein should be interpreted as limiting the disclosure to any particular virtualization aspect.

The process of compressing, encoding and decoding graphics data as referring to herein may generally use one or more methods and systems described in commonly assigned U.S. Pat. No. 7,460,725 entitled "System And Method For Effectively Encoding And Decoding Electronic Information," hereby incorporated by reference in its entirety.

In various methods and systems disclosed herein, improvements to the transmission of remote presentation graphics data to a client computer may be implemented to provide a more timely and rich user experience, in particular when providing a remote presentation session to a client computer in a virtual machine environment. The embodiments disclosed herein for encoding and transmitting graphics data may be implemented using various combinations of hardware and software processes. In some embodiments, functions may be executed entirely in hardware. In other embodiments, functions may be performed entirely in software. In yet further embodiments, functions may be implemented using a combination of hardware and software processes. Such processes may further be implemented using one or more CPUs and/or one or more specialized processors such as a graphics processing unit (GPU) or other dedicated graphics rendering devices.

Figure 7:
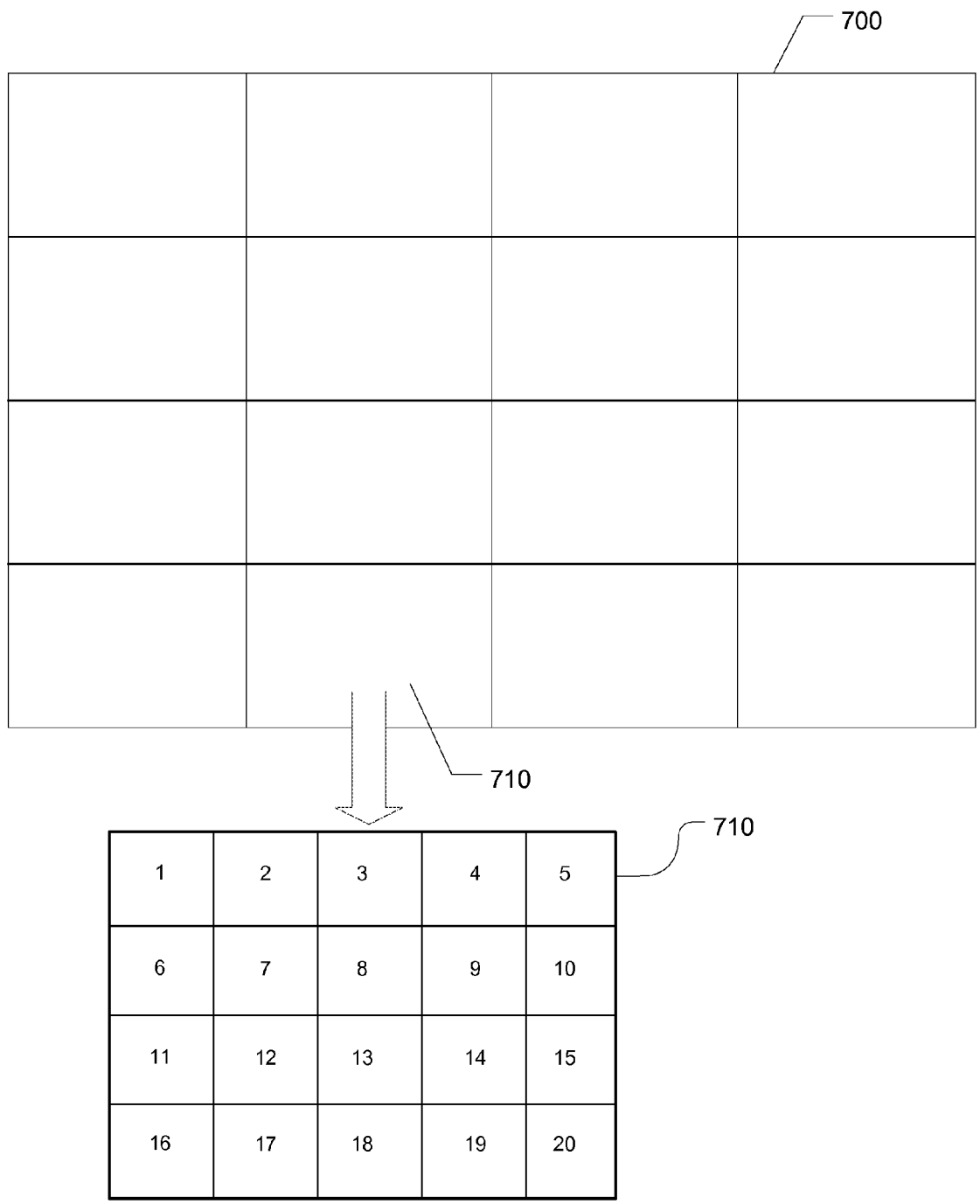
FIG. 7 illustrates an overview of some of the processes disclosed herein.

As discussed above, a video frame may be logically partitioned into a plurality of smaller tiles. The client screen data may be arranged using a variety of schemes. Each frame may be captured, however only the changed tiles may be processed according to the processes disclosed above. For example, referring to FIG. 7, a virtual frame 700 to be transmitted to the encoding system may comprise sixteen client frames. An exemplary client screen 710 may further be divided into twenty tiles and encoded using the techniques described herein.

Figure 8:
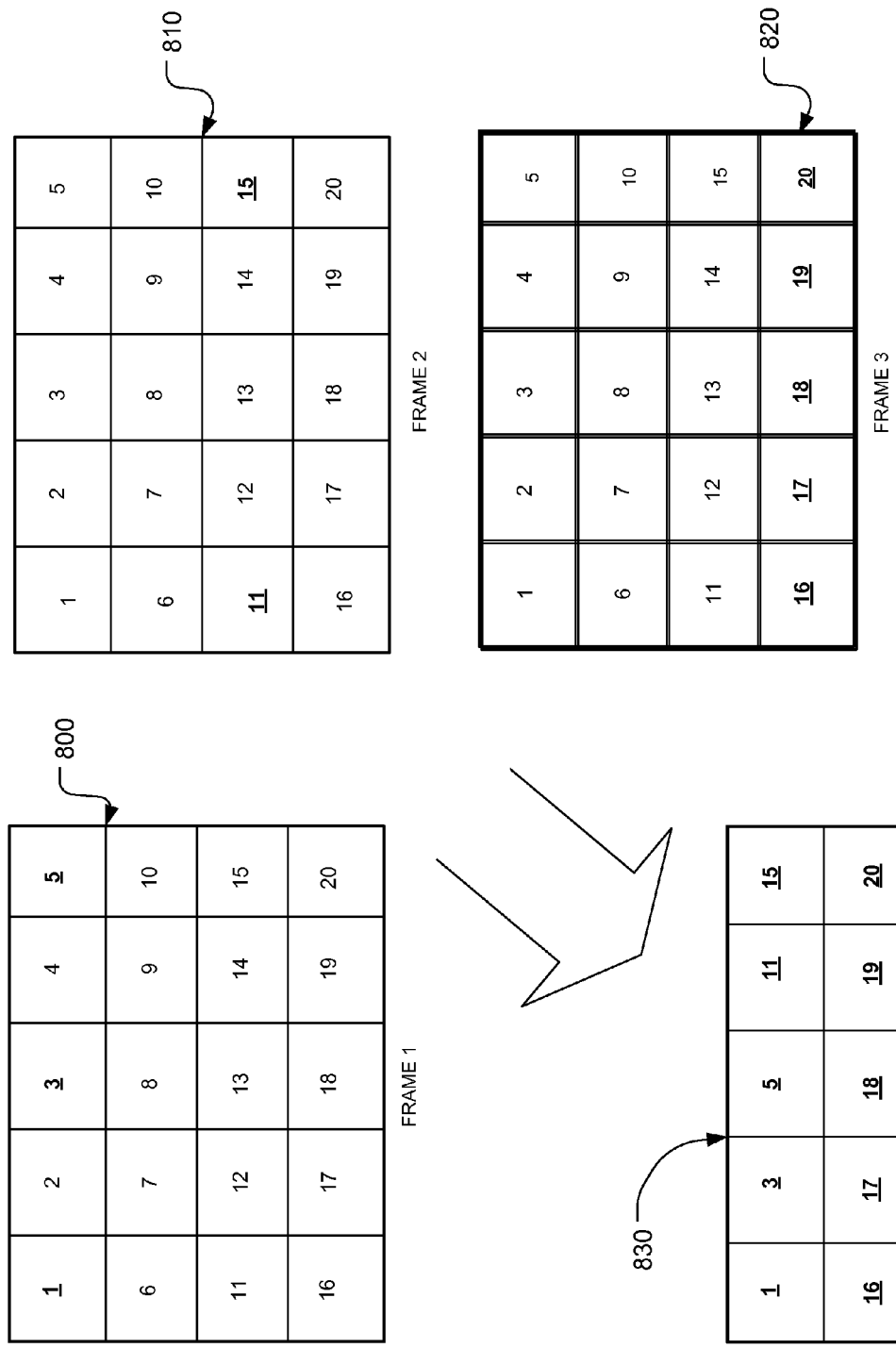
FIG. 8 illustrates an overview of some of the processes disclosed herein.

In another embodiment, a changed-tile mode may be provided that tracks which tiles have changed and providing only the changed tiles to the encoding engine for processing. For example, the CPU may keep track of which tiles are changed, and only the changed tiles may be provided for further processing. For example, 4×5 tiles may be implemented for a screen. In this embodiment, only tiles that changed may be transferred for that screen. Referring to FIG. 8, frame 1 800 may include three changed tiles 1,3 and 5 (emphasized by bolded and underlined tile numbers). Frame 2 810 may include two changed tiles 11 and 15. Frame 3 820 may include five changed tiles 16, 17, 18, 19 and 20. The resulting sequence of tiles 830 sent to the encoding system may include the set of changed tiles from the three frames, including tiles 1, 3, 5, 11, 15, 16, 17, 18, 19, and 20.

Various methods may be used to transfer the changed tiles. For example, the changed tiles may be bit block transferred to the display frame and sent across the link to the encoding engine. In this fashion, changed tiles from multiple clients can be included within a server display frame. The tiles may further be embedded with information on which client the tile belongs. In an embodiment, the first tile row may be used to provide information about the rest of the tiles such as client association, frame number, tile offset, and the like.

The methods disclosed herein are not limited to a particular type of graphics data such as bitmaps. The disclosed methods can apply to any type of graphic object. For example, the graphics data may comprise a description of entities to be drawn. Generally the lossless channel can be used to notify the client of the type and nature of the data that will be transmitted and the expected result after rendering. The actual graphics data can then be transmitted to the client on the lossy channel, and the client can compare what was actually received and the result of the rendering actions to determine if any data was missing or if there is a discrepancy between what was expected in the received data or as a result of performing the expected actions on the data. In one embodiment the client can note any transactions not received or screen areas that have not been updated and notify the server of the discrepancy. In other embodiments, the client make some intelligent decisions such as determining that only a small portion of the screen is missing and determining to wait longer for the missing data or determine that the data is not needed.

The disclosed techniques may be applied to multiple monitor scenarios. A component on the server may, for example, determine the number of video presentation paths from the video presentation network information as maintained by the server. Each video presentation source may be provided with a set of video data as described above.

Graphics Remoting Using Metadata Hints

Figure 9:
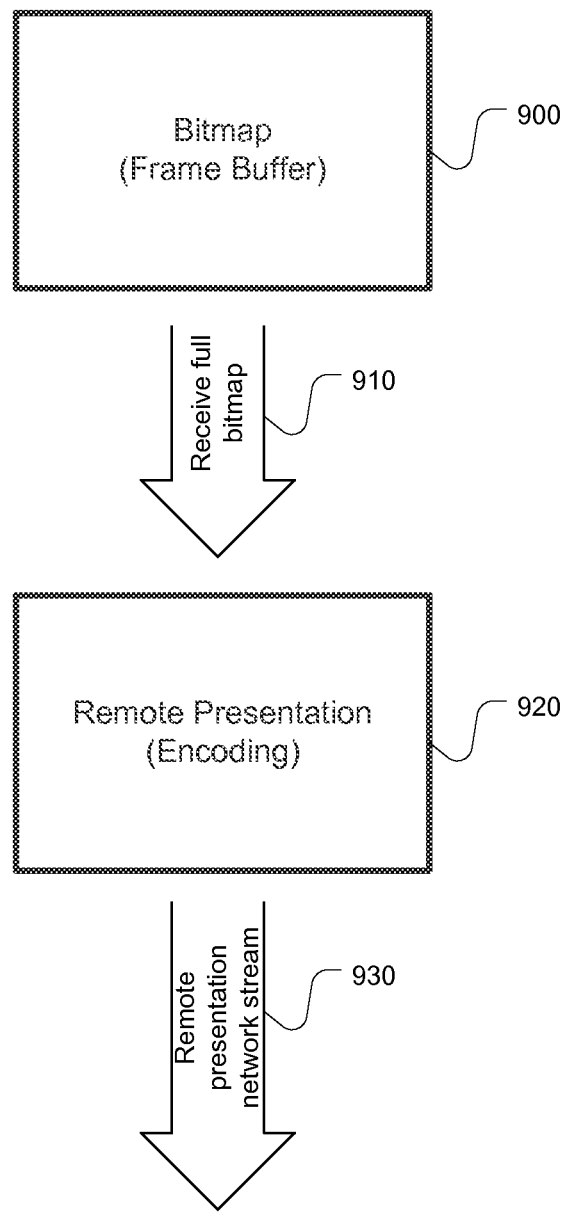
FIG. 9 illustrates an overview of some of the processes disclosed herein.

When providing remote presentation of graphics data, two types of remoting techniques may be used. One technique is based on updating and transmitting the frames and the other technique is based on rendering the frames and sending the bitmaps of the rendered frames. Referring to FIG. 9, in the first technique a frame may be captured in a frame buffer 900. The captured frame data may then passed 910 to a remote presentation process for encoding 920 and other processes that produce a remote presentation network stream 930 comprising bitmap data. A bitmap is a portion of data used to represent an image and is typically a data structure representing a generally rectangular grid of pixels that can be rendered on a client computer. A bitmap may be stored in an image file of various formats such as .bmp, .jpg, and .png. A bitmap may correspond to an image displayed on a screen or a portion of such an image.

Figure 10:
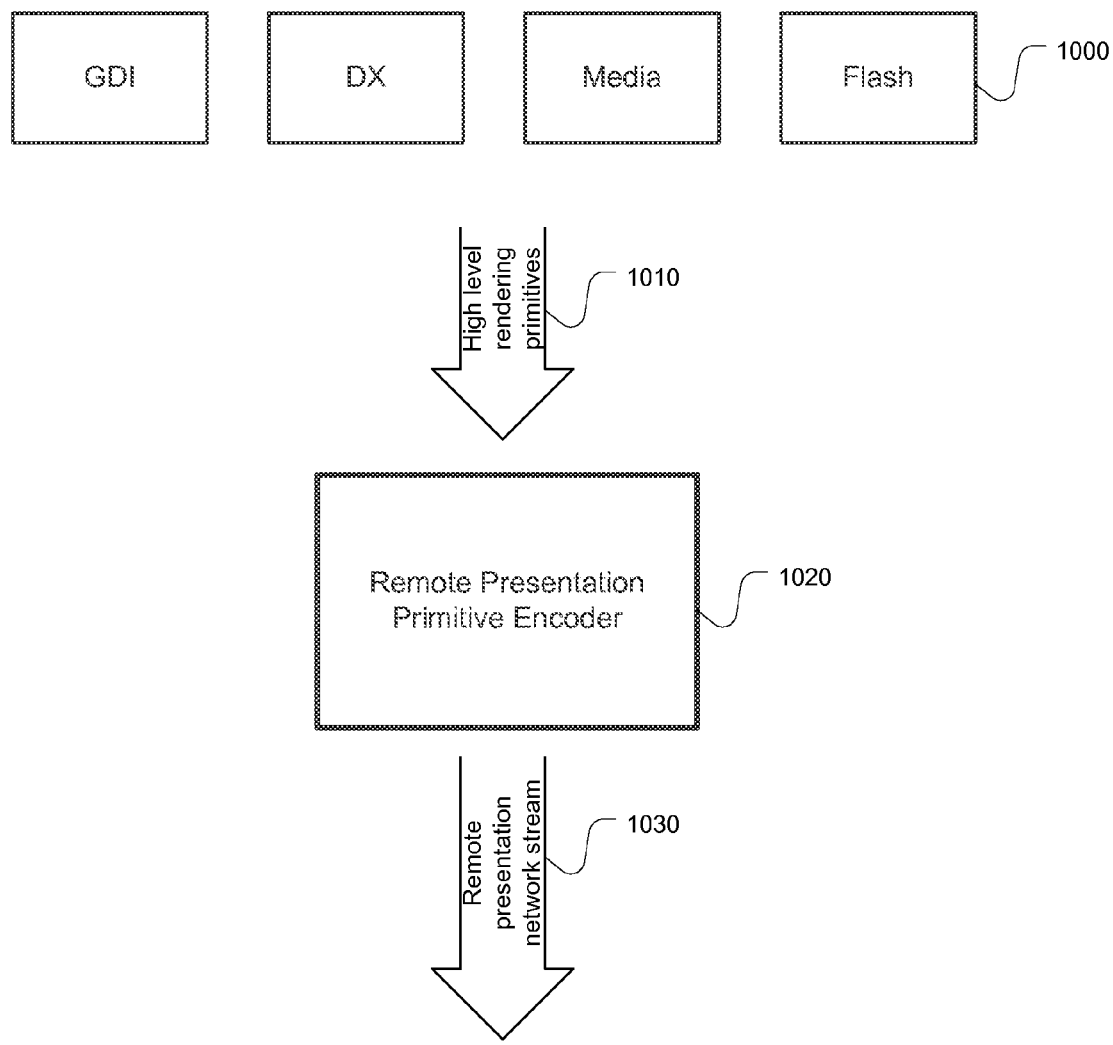
FIG. 10 illustrates an overview of some of the processes disclosed herein.

Referring to FIG. 10, in the other technique a number of types of components in the system 1000 may be used for producing primitives. For example, GDI, DirectX, Media, and Flash and other functions 1000 may each produce a stream of high-level rendering commands 1010 which are called primitives. The primitives may then be passed to a remote presentation primitive encoder 1020 which performs data transformation, compression, caching, etc. A primitive stream 1030 is provided that in some cases will result in higher-level commands providing more efficient performance as compared to the first technique.

Both techniques are characterized by various advantages and disadvantages. It would be advantageous to combine the features of the two techniques to provide a method and system that incorporates the benefits of both techniques. For example, when using the RDP protocol, it would be beneficial to receive from the system high-level primitives (e.g., commands such as DrawText, or indications such as a window that has moved or scrolled). However, such a system may not be compatible with the general trend of graphics stacks and the rise of a multitude of proprietary graphics remoting layers that make it impractical for the system to provide RDP with high level primitives for bitmap operations.

Furthermore, existing systems are configured such that the set of primitives needed by the remote presentation protocol would result in a high volume of primitives that may be impractical to remote because the bandwidth required would be very high.

Disclosed herein is a technique in which bitmaps are transmitted but provides improvements to bitmap data transmission by using some of the advantages of primitive remoting, thus allowing for the reduction of the bandwidth and processing needed to remote a virtual desktop experience. In an embodiment, rendering is performed and bitmaps are remoted, but metadata comprising shortcuts or hints are provided to assist in the rendering of the bitmap data. For example, the metadata may provide useful information to describe the transition from one set of bitmap data to another. In various embodiments, such an extension to a remote presentation protocol can include the following attributes:

1. Efficient direct access to the final rendered content on the screen (i.e., the frame buffer). This access may be direct video memory access through a mapped view or alternative mechanism.

2. One or more of:

a. Efficient indications of the dirty or changed rectangles or tiles, i.e., what has changed from frame to frame.

b. A copy of the last frame (for frame differencing purposes).

c. Metadata hints that inform the remoting driver what structurally has happened to create that bitmap. Some examples include:

i. Indications of what portions of the screen were window moves (i.e., rectangle A moved to rectangle B).

ii. Indications of what portions of the screen were scroll operations (i.e. rectangle A scrolled by a displacement Vector V {xdelta, ydelta}.

iii. Indications of what rectangles of the screen are predominantly text content.

iv. Indications of what portions of the screen are predominantly video or other animated content.

v. Indications of what portions of the screen are 'higher priority for the user', i.e., areas which may require user input such as text controls with the area of focus. This would allow the system to deprioritize other areas such as a gadget showing a slideshow that is purely decorative and emphasize remoting of areas the user has a need to read and respond to quickly.

Once the remote presentation driver has determined the metadata, the metadata and any bitmap data can be transmitted to the client. The remote presentation protocol can thus make use of the metadata to improve the remoting experience. As an example, the remote presentation protocol can generally follow the form of using the metadata to encode a small remote presentation order such as 'Copy Screen from RECT A to RECT B' instead of sending the corresponding bitmap contents for RECT A and RECT B.

Accordingly, it may not be necessary to send the bitmap data for an entire screen frame if the frame can be rendered using a portion of the bitmap data or based on previously transmitted data. In various embodiments, a set of embedded primitives can be sent that allow for transitioning from a first bitmap of a first frame to a second bitmap of a second frame without sending all of the bitmap data. For example, a first frame may depict a screen for a user using a Microsoft Word application with an open document. In the second frame, the screen may represent the same view of the Word document but scrolled one line down. If a full bitmap implementation is being used, then the entire screen as represented by a bitmap must be sent because, on a pixel by pixel basis, the entire screen has changed. However, using primitives such a system may only have to send a reference to the previous frame and the direction and magnitude of movement of the screen as well as the new bitmap data for the bottom area of the screen that has changed. The changed areas can be sent using bitmap data, but the majority of the screen can be rendered with reference to the previously sent data and a description of the change of the screen view.

In one embodiment, the remote presentation encoder may determine the metadata (i.e., primitives or hints) to be provided to the client and how to efficiently encode the hints. The hints can comprise various types of descriptors that may include graphics primitives. For example, the hints can be graphics motion hints that describe how the current window is moving from frame to frame. As a result it will not be necessary to encode the bitmap in its entirety. Rather, a hint can be sent that describes how the screen should be moved and the encoder may only send any new data that the client has not previously received. It can be appreciated that the metadata can comprise any type of information useful for rendering a client screen using previously sent bitmap data or a portion of current bitmap data. Examples include but are not limited to 3-D commands describing the rotation of an object or changing of a view point.

Figure 11:
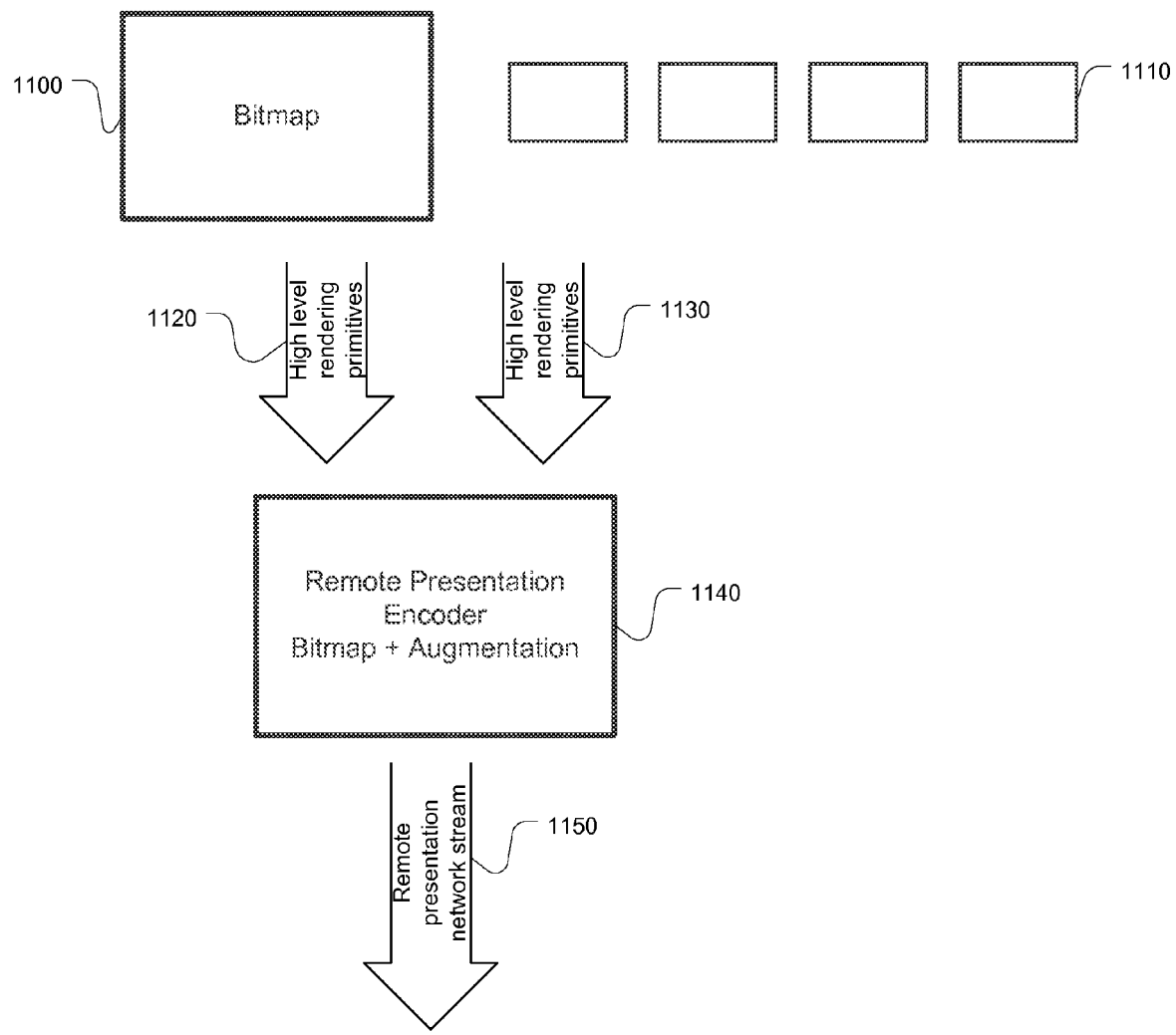
FIG. 11 illustrates an example architecture illustrating aspects of the methods disclosed herein.

Referring to FIG. 11, in one embodiment a hybrid method or system can be implemented that incorporates both the full bitmap and graphics primitive encoding techniques. Many current remote presentation systems do not provide access to such metadata in the context of bitmap streams. In an embodiment such primitives 1130 may be obtained from various system layers 1110 to augment bitmaps 1120 from a graphics source 1100 with metadata for the most high-value operations. An encoder 1140 may be provided that augments bitmap data with one or more hints from among a predetermined set of metadata that can be transmitted into the remote presentation bitmap stream 1150 with the bitmap data. In one embodiment the predetermined set of metadata can comprise a smaller subset of the full set of primitive commands that typically make up such command sets for graphics rendering systems. Such a subset may comprise, for example, twenty or thirty of the most high value commands as compared to the hundreds of commands that may be available.

In an embodiment a remote presentation encoder may be provided that receives information from rendering subsystems to determine a set of metadata that describes actions performed to produce a bitmap. The encoder may be configured to determine, based on the received information, whether a portion of the bitmap data or all of the bitmap data should be placed on the remote presentation bitmap stream and which metadata should be encoded into the data stream. In some cases no additional bitmap data may need to be sent (e.g., when the next frame can be rendered entirely as a function of previously received bitmap data).

In some cases the metadata can be used to determine that part or all of the bitmap data will be used for future rendering and therefore that the data should be cached for later use. For example, if part of the bitmap data represents a portion of the screen that will now be hidden "behind" another on-screen object, the metadata can include indications of this rendering action. The downstream system can use this information to determine that the "hidden" bitmap data can be cached so that when the "front" object is moved, the previously hidden bitmap which has been cached can be used to restore the hidden area without the need to receive the bitmap data from the remote presentation server.

The metadata can also be used to describe all of the changes between frames. For example, the metadata can include indications that only a certain part of the screen has changed, in which case the client can apply processing to only the changed areas. In some embodiments graphics APIs can provide the information that can be used to determine the metadata.

Figure 12:
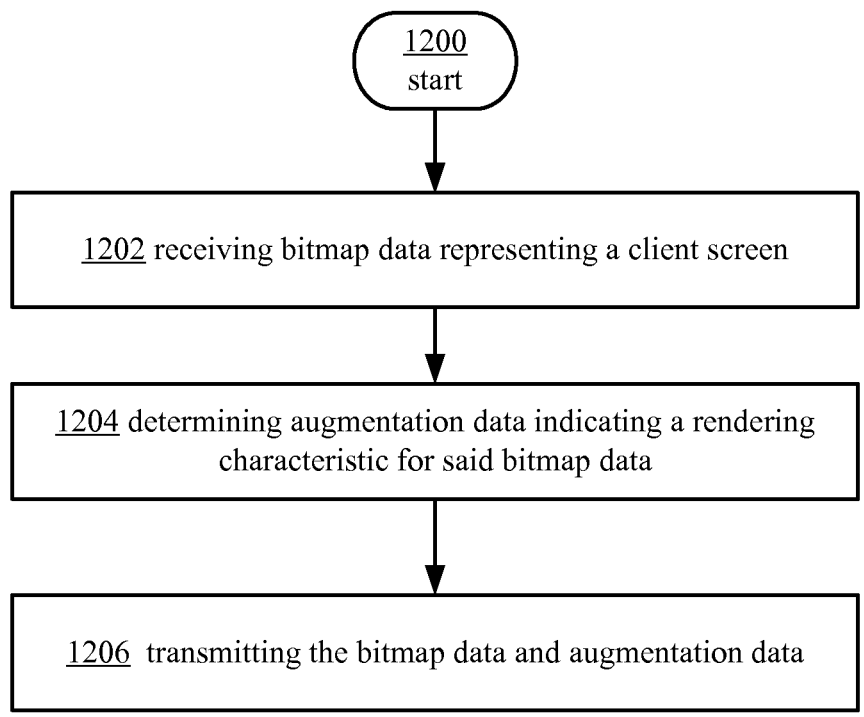
FIG. 12 illustrates an example of an operational procedure for processing graphics data for transmission to a client computer.

FIG. 12 depicts an exemplary operational procedure for transmitting data from a computing device to a client computing device including operations 1200, 1202, 1204, and 1206. Referring to FIG. 12, operation 1200 begins the operational procedure and operation 1202 illustrates receiving, from a screen capture process, bitmap data representing a client screen associated with a virtual machine session. Operation 1204 illustrates determining augmentation data indicating a rendering characteristic for said bitmap data. Operation 1206 illustrates transmitting the bitmap data and augmentation data to said client computer.

Figure 13:
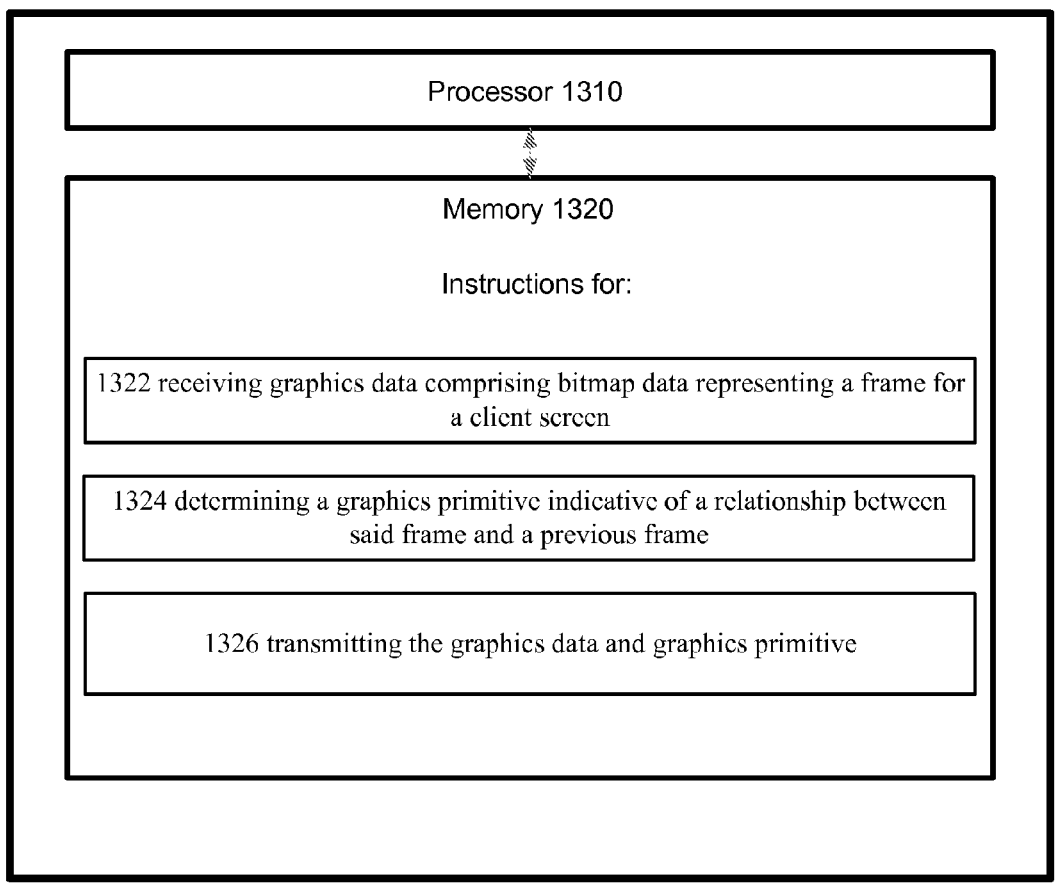
FIG. 13 illustrates an example system for processing graphics data for transmission to a client computer.

FIG. 13 depicts an exemplary system for transmitting presentation graphics data to a client computer. Referring to FIG. 13, system 1300 comprises a processor 1310 and memory 1320. Memory 1320 further comprises computer instructions configured to transmit remote presentation graphics data to a client computer. Block 1322 illustrates receiving graphics data comprising bitmap data representing a frame for a client screen associated with the client computer. Block 1324 illustrates determining a graphics primitive indicative of a relationship between said frame and a previous frame. Block 1326 illustrates transmitting the graphics data and graphics primitive to said client computer.

Figure 14:
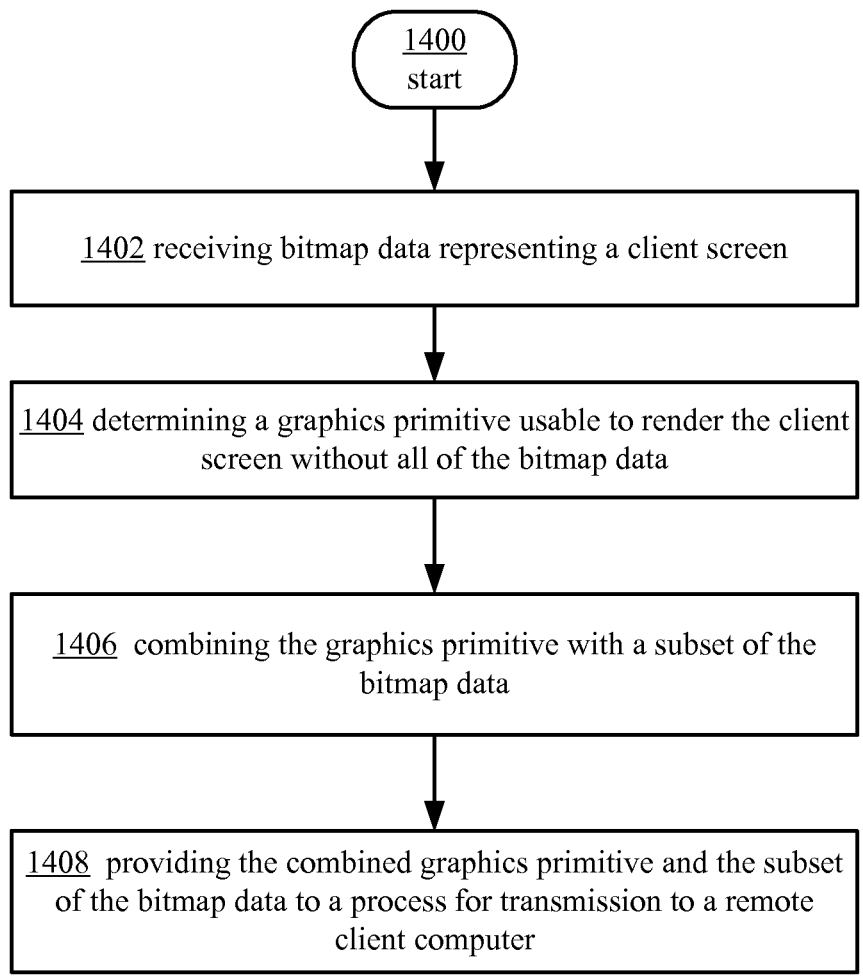
FIG. 14 illustrates an example of an operational procedure for processing graphics data for transmission to a client computer.

FIG. 14 depicts an exemplary operational procedure for transmitting improving the transmission and processing of remote presentation data including operations 1400, 1402, 1404, 1406, and 1408. Referring to FIG. 14, operation 1400 begins the operational procedure and operation 1402 illustrates receiving bitmap data representing a client screen. Operation 1404 illustrates determining a graphics primitive usable to render the client screen without all of the bitmap data. Operation 1406 illustrates combining the graphics primitive with a subset of the bitmap data. Operation 1408 illustrates providing the combined graphics primitive and the subset of the bitmap data to a process for transmission to a remote client computer.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A method for transmitting data from a server computer to a client computing device, the method comprising:
receiving, from a screen capture process, bitmap data representing a full client screen associated with a virtual machine session;
determining metadata including at least one primitive to assist in rendering the client screen, wherein the metadata includes information indicating which portions of the full client screen are user priority areas;
determining a portion of the bitmap data to be transmitted, wherein the portion of the bitmap data includes less than all of the bitmap data representing the full client screen; and
transmitting the portion of the bitmap data and the metadata to the client computing device, wherein a combination of the portion of the bitmap data and the metadata is usable to render the full client screen on the client computing device.

2. The method of claim 1, further comprising dividing the bitmap data into data tiles.

3. The method of claim 2, wherein the metadata indicates which of the data tiles are changed.

4. The method of claim 3, further comprising transmitting only the changed data tiles.

5. The method of claim 1, further comprising transmitting bitmap data representing a previous client screen.

6. The method of claim 1, wherein the metadata comprises information indicating how the bitmap data was generated.

7. The method of claim 6, wherein the information indicates which portions of the full client screen were window moves.

8. The method of claim 6, wherein the information indicates which portions of the full client screen were scroll operations.

9. The method of claim 8, wherein the scroll operations comprises a rectangle and a displacement vector.

10. The method of claim 6, wherein the information indicates which portions of the full client screen are predominantly text content.

11. The method of claim 6, wherein the information indicates which portions of the full client screen are predominantly video content.

12. A system configured to transmit presentation graphics data to a client computer, comprising:
at least one processor; and
at least one memory communicatively coupled to the at least one processor when the system is operational, the memory having stored therein computer-executable instructions that, upon execution by the at least one processor, cause the system to perform a method comprising:
receiving graphics data comprising bitmap data representing a full frame for a client screen associated with the client computer;
determining metadata including a graphics primitive indicative of a relationship between the full frame and a previous frame, wherein the metadata includes information indicating which portions of the full client screen are user priority areas;
determining a portion of the graphics data to be transmitted, the portion of the graphics data determined based on the graphics primitive, the portion of the graphics data including less than all of the bitmap data representing the full frame for the client screen; and
transmitting the portion of the graphics data and the graphics primitive to the client computer, wherein a combination of the portion of the graphics data and the graphics primitive is usable to render the full frame for the client screen associated with the client computer.

13. A method for improving the transmission and processing of presentation data, the method comprising:
receiving bitmap data representing an entire client screen;
determining metadata including a graphics primitive usable to render the entire client screen without all of the bitmap data, wherein the metadata includes information indicating which portions of the full client screen are user priority areas;
combining the graphics primitive with a subset of the bitmap data, the subset of the bitmap data including less than all of the bitmap data representing the entire client screen; and
providing the combined graphics primitive and the subset of the bitmap data to a process for transmission to a remote client computer, wherein the combined graphics primitive and the subset of the bitmap data is usable for rendering the entire client screen on the remote client computer.

14. The method of claim 13, wherein the graphics primitive is determined as a function of bitmap data representing a previous client screen.

15. The method of claim 13, wherein the graphics primitive is indicative of a relationship between the client screen and a previous client screen.

16. The method of claim 13, wherein the subset of the bitmap data comprises screen areas that have changed since a previous client screen.

17. The method of claim 16, wherein the graphics primitive indicates a relative movement of bitmap data for the previous client screen.

18. The method of claim 13, wherein the entire client screen is associated with a virtual machine session.

19. The method of claim 18, wherein the method is performed by a remote presentation encoder.

20. The system of claim 12, wherein the graphics primitive indicates a relative movement of bitmap data from the previous frame.

* * * * *